(12) United States Patent
Lingen

(10) Patent No.: US 10,721,149 B1
(45) Date of Patent: *Jul. 21, 2020

(54) METHOD AND APPARATUS OF DISCOVERING AND MONITORING NETWORK DEVICES

(71) Applicant: OPEN INVENTION NETWORK LLC, Durham, NC (US)

(72) Inventor: Mark Thomas Lingen, Woodinville, WA (US)

(73) Assignee: OPEN INVENTION NETWORK LLC, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/391,565

(22) Filed: Apr. 23, 2019

Related U.S. Application Data

(63) Continuation of application No. 15/274,389, filed on Sep. 23, 2016, now Pat. No. 10,270,675, which is a continuation of application No. 12/983,029, filed on Dec. 31, 2010, now Pat. No. 9,455,872.

(51) Int. Cl.
*H04L 29/06* (2006.01)
*H04L 12/26* (2006.01)
*G06F 11/30* (2006.01)
*H04L 12/24* (2006.01)

(52) U.S. Cl.
CPC ...... *H04L 43/0811* (2013.01); *G06F 11/3006* (2013.01); *G06F 11/3013* (2013.01); *G06F 11/3041* (2013.01); *G06F 11/3051* (2013.01); *H04L 41/0806* (2013.01); *H04L 41/0853* (2013.01); *H04L 41/0873* (2013.01); *H04L 41/0886* (2013.01); *H04L 41/12* (2013.01); *H04L 43/16* (2013.01)

(58) Field of Classification Search
CPC . H04L 43/0811; H04L 41/0886; H04L 41/12; H04L 41/0853; H04L 41/0873; H04L 43/16; H04L 41/0806
See application file for complete search history.

(56) References Cited

U.S. PATENT DOCUMENTS

| 7,353,269 | B2 | 4/2008 | Aki et al. |
| 7,477,702 | B2 * | 1/2009 | Tang .................. H04L 1/0003 370/252 |
| 7,730,174 | B2 | 6/2010 | Keefer et al. |
| 7,920,467 | B2 | 4/2011 | Gilmour |

(Continued)

*Primary Examiner* — Chau Le

(57) ABSTRACT

A method and apparatus of monitoring computer devices operating on a network is disclosed. One example method may include discovering and monitoring a plurality of network devices operating on a network. The method may include scanning the network to discover various network devices and determining a device type of each of the network devices. The method may also include determining attributes corresponding to each of the network devices, monitoring the attributes corresponding to each of the network devices and compiling a list of attribute information based on the monitoring operation and storing the list of attribute information in a memory. The device discovery and monitoring may be performed autonomously without user intervention allowing computer devices to be discovered and monitored as they are added to the network.

20 Claims, 7 Drawing Sheets

(56) References Cited

U.S. PATENT DOCUMENTS

| | | |
|---|---|---|
| 2002/0141337 A1* | 10/2002 | Grandin .................. H04L 43/16 |
| | | 370/229 |
| 2002/0161883 A1 | 10/2002 | Matheny et al. |
| 2004/0205167 A1 | 10/2004 | Grumann |
| 2005/0044198 A1 | 2/2005 | Okitsu et al. |
| 2005/0220137 A1 | 10/2005 | Prigent et al. |
| 2006/0212556 A1 | 9/2006 | Yacoby et al. |
| 2007/0208837 A1 | 9/2007 | Tian et al. |
| 2007/0208920 A1 | 9/2007 | Tevis |
| 2010/0250308 A1 | 9/2010 | Mayer et al. |
| 2012/0054331 A1 | 3/2012 | Dagan |
| 2016/0066301 A1* | 3/2016 | Zhu ....................... H04W 28/18 |
| | | 370/329 |

* cited by examiner

METHOD AND APPARATUS OF DISCOVERING AND MONITORING NETWORK DEVICES

TECHNICAL FIELD OF THE INVENTION

This invention relates to a method and apparatus of discovering and monitoring network devices, and, more specifically, to discovering network devices operating on a network and determining which objects associated with the network devices need to be monitored and performing the monitoring autonomously.

BACKGROUND OF THE INVENTION

Automated computer device discovery services are commonplace in the data communication world today. All types and variations of computers, handheld devices, laptops, smartphones, servers, terminals or other computing devices are generally part of a communication network. As a result, automated device discovery operations have been used to maintain an accurate record of active network devices operating on a network.

In addition, network device monitoring is also an important part of everyday network procedures. Servers and computer agents may be used to centrally manage and monitor various features, such as, network device performance and activities. For example, a laptop or desktop computer operated by an employee of a corporation may receive multiple daily management processes and scheduled maintenance routines from a remote server during the course of day.

Examples of management monitoring processes may include: monitoring computer device services, processes and device metrics, such as, memory availability, application use, hard disk space, software driver updates and software patches, etc. However, it is not a simple task to monitor hundreds or even thousands of computers across an entire enterprise. For instance, the individual network devices operating on a network may have customized applications, hardware components, etc., and may not require certain monitoring operations to be performed.

A typical monitor set may include instructions for monitoring all drives (hard disks and virtual drives) on a particular machine, such as, the "A:", "B:", "C:", "D:" and "E:" drives, and so on. However, a laptop computer may only have a "C:" and "D:" drive as part of its hardware profile. In such a case, the predefined monitoring operations of the specific monitor sets, if applied to the laptop, may still perform monitoring on all of the predefined drives. This may return unnecessary errors, and may require extra time and processing to perform these unneeded monitoring operations. Performing a monitor operation on five drives on a machine that only has two drives may provide unfavorable results.

By discovering valid objects belonging to corresponding network elements, tailored monitoring operations may be setup and performed to reduce errors, time and network resources. Additionally, autonomous procedures used to discover network devices and the corresponding attributes may reduce the amount of human intervention required to maintain a communications network.

SUMMARY OF THE INVENTION

One embodiment of the present invention may include a method of discovering and monitoring a plurality of network devices operating on a network. The method may include scanning the network to discover network devices and determining a device type for each of the network devices. The method may also include determining attributes corresponding to each of the network devices and monitoring the attributes corresponding to each of the network devices. The method may also include compiling a list of attribute information based on the monitoring operation and storing the list of attribute information in a memory.

Another example embodiment may include an apparatus configured to discover and monitor network devices operating on a network. The apparatus may include a memory configured to store information regarding the network devices. The apparatus may also include a processor configured to scan the network to discover the network devices, and to determine a device type of each of the network devices. Other operations performed by the processor may include to determine attributes corresponding to each of the network devices, monitor the attributes corresponding to each of the network devices, and compile a list of attribute information based on the monitoring operation and store the list of attribute information in the memory.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
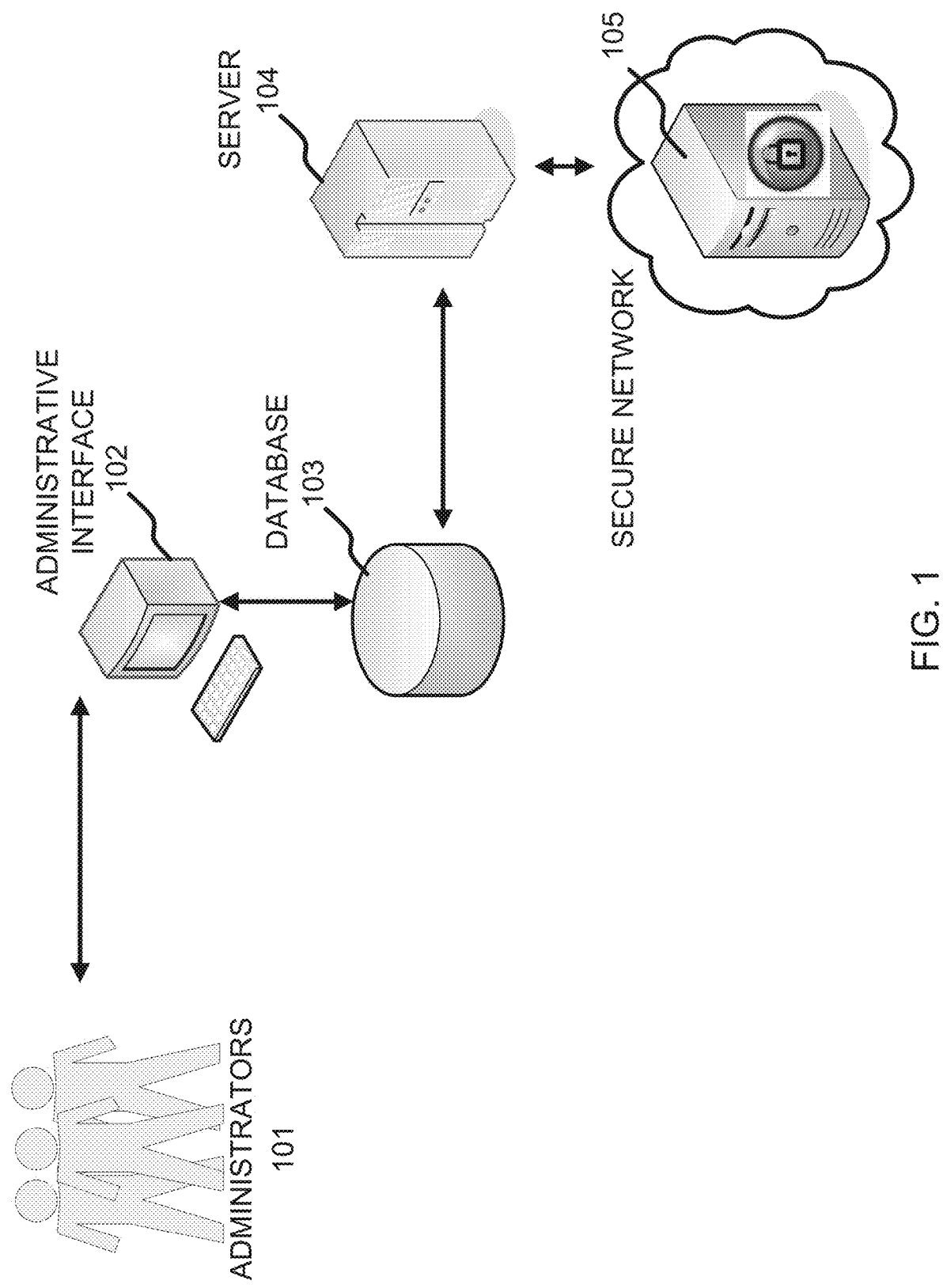
FIG. 1 illustrates an example network configuration, according to example embodiments of the present invention.

FIG. 1 illustrates an example communication network, according to example embodiments of the present invention. Referring to FIG. 1, administrators 101 may access an administrative user interface 102 to begin operating a monitoring procedure. The interface may be a virtual array processor (VSA) interface that is accessible via a user terminal computer or other interface device. The VSA interface is a functional interface that may be used to perform operations and functions and control program execution.

The administrators 101 may perform assignments to setup a "discovery collector" and/or a "monitor collector." The discovery collector performs discovery of the network devices operating on the communications network. Once the network devices are discovered, the monitor collector may include objects and corresponding thresholds defined by counters, which are used to maintain a record of network devices. The objects that may be monitored may include computer parameters, such as, processor use, memory availability, application use, hard disk space, updated software drivers and patches, etc. The monitor collector is also responsible for monitoring network traffic of network devices.

Figure 2:
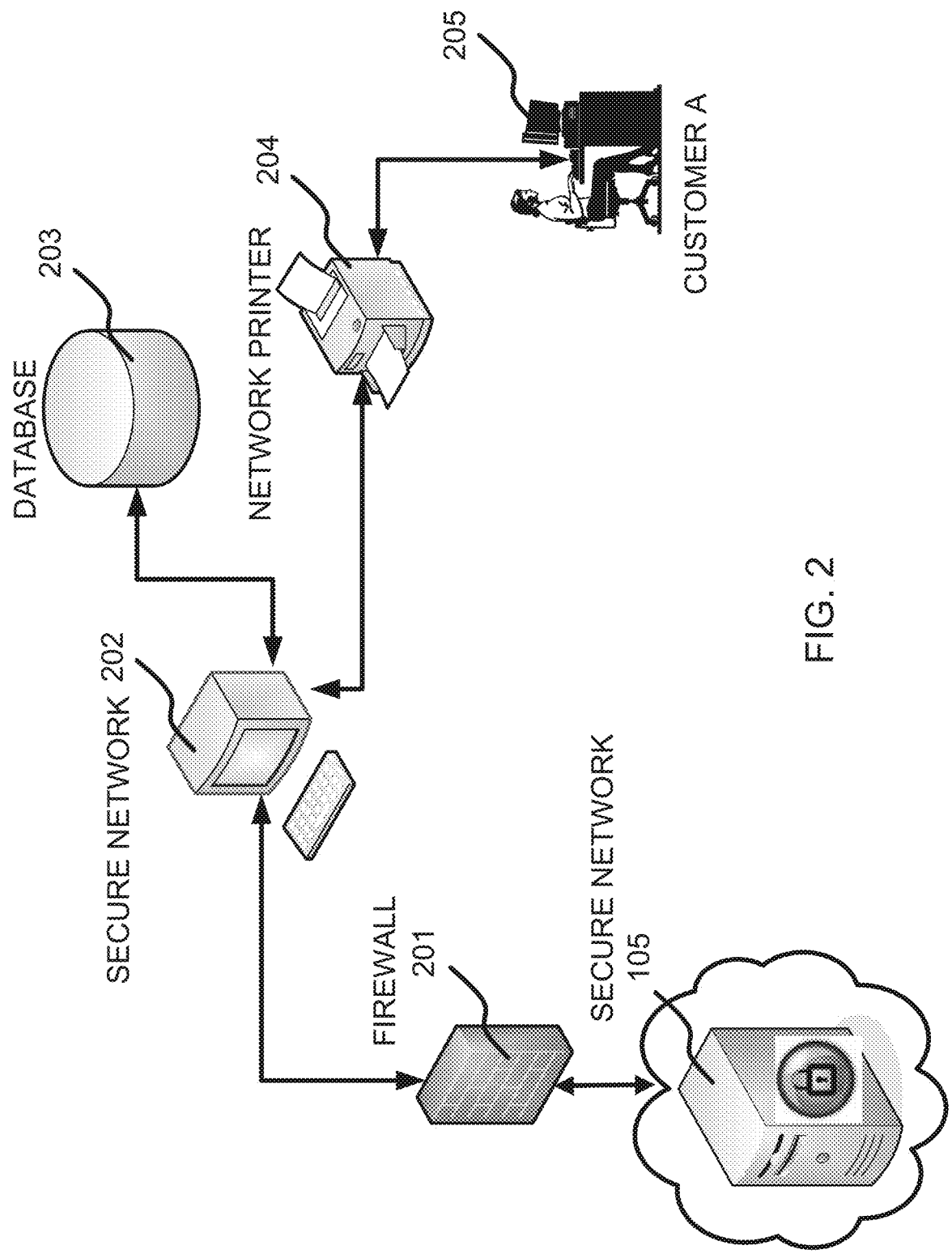
FIG. 2 illustrates another example network configuration, according to example embodiments of the present invention.

Each network device operating within the networks illustrated in FIGS. 1 and 2 may have different attributes, such as, different hardware configurations and/or varying applications that are used/installed on the different network devices. Examples of attributes are processor type, memory capacity, hard disk size, number of disks (physical and/or logical), processes, applications, etc. As a result, such varying configurations will result in varying object sets that are derived from an audit operation of the respective network devices.

An automatic learning ("auto-learn") procedure may be used to create a new monitor set of objects that may be implemented by the monitor collector. The auto-learn procedure may be used to monitor current operating conditions of computers on the network and dynamically set new threshold values. Certain logic may be established as data collectors, which are used to guide the auto-learn procedure. For example, the amount of time or the duration of time that data is collected indicating the usage levels of certain objects of the network computers, may be a defined logic collector. The interval amount by which to increase or decrease an alarm threshold value may be defined as a maximum or minimum value that should not be exceeded or undermined under any circumstances, etc.

The auto-learn procedure may be setup and executed based on a trial run or test procedure of monitoring the behavior of one or more computers on the network. Initially, a baseline or predefined monitor set may be deployed based on one or more default objects to be monitored. The monitor set may be initiated by the administrative interface 102 and may be used to analyze the compiled or collected user object data stored in the database 103. The server 104 may be setup to perform the monitor set deployment procedure by monitoring the individual customer computers/devices and storing the retrieved object data in the database 103.

Monitoring customer computers may be performed by executing monitoring procedures and accessing customers remotely via a secure network portal 105. Continuing with the network communication of FIG. 1, the flow of data is further illustrated with reference to FIG. 2. Referring to FIG. 2, the secure network 105 includes a firewall 201 that may be authenticated to obtain access to the customer network. A secure network 202 provides access to customer computers, such as, customer A 205. Other devices on the network may be monitored, such as, a network printer 204, print server or email server, etc. A database 203 may provide access to customer data and related customer information.

According to example embodiments of the present invention, it may be necessary to audit each of the network computing devices to determine the customized objects associated with each device. By determining the objects associated with the operation of each audited device, the customized monitor sets may be scaled back to remove unnecessary auditing of objects not relevant to each device. Each audited device provides the capability to derive a monitor set customized for that device. For example, if a monitor set was setup to monitor the "E:" disk drive and was applied to monitor a device without any "E:" disk drive, then processor speed, time, and resources are wasted during this monitoring procedure.

Once the devices operating on the network are discovered, the monitor collector may be automatically setup within a subnet of the network to automatically monitor the devices discovered. Such an ongoing monitoring operation may be performed without any user interaction. The monitoring may continuously run scan and find new devices and the data obtained from the monitor collector may provide distributive data sources allowing for optimized scalability.

In operation, once the administrators setup a discovery collector application, a ping operation may be implemented to ping the devices on the network and await a response. The discovered devices may then be audited to determine a monitor set of objects and attributes that may be monitored thereafter. The device monitoring may be performed according to a specific time interval. Any changes with the discovered network devices will automatically be discovered based on the ongoing scheduled monitoring and re-monitoring procedures. It is noted that it is not necessary to deploy anything to the monitored devices. For example, with the aforementioned type of monitoring, it's may be performed from the collector without installing anything on the device. The monitoring operations are remotely controlled, such as, ping, deep scan, audit and data collecting. There is no need for an agent to be installed on the monitored device.

Figure 3:
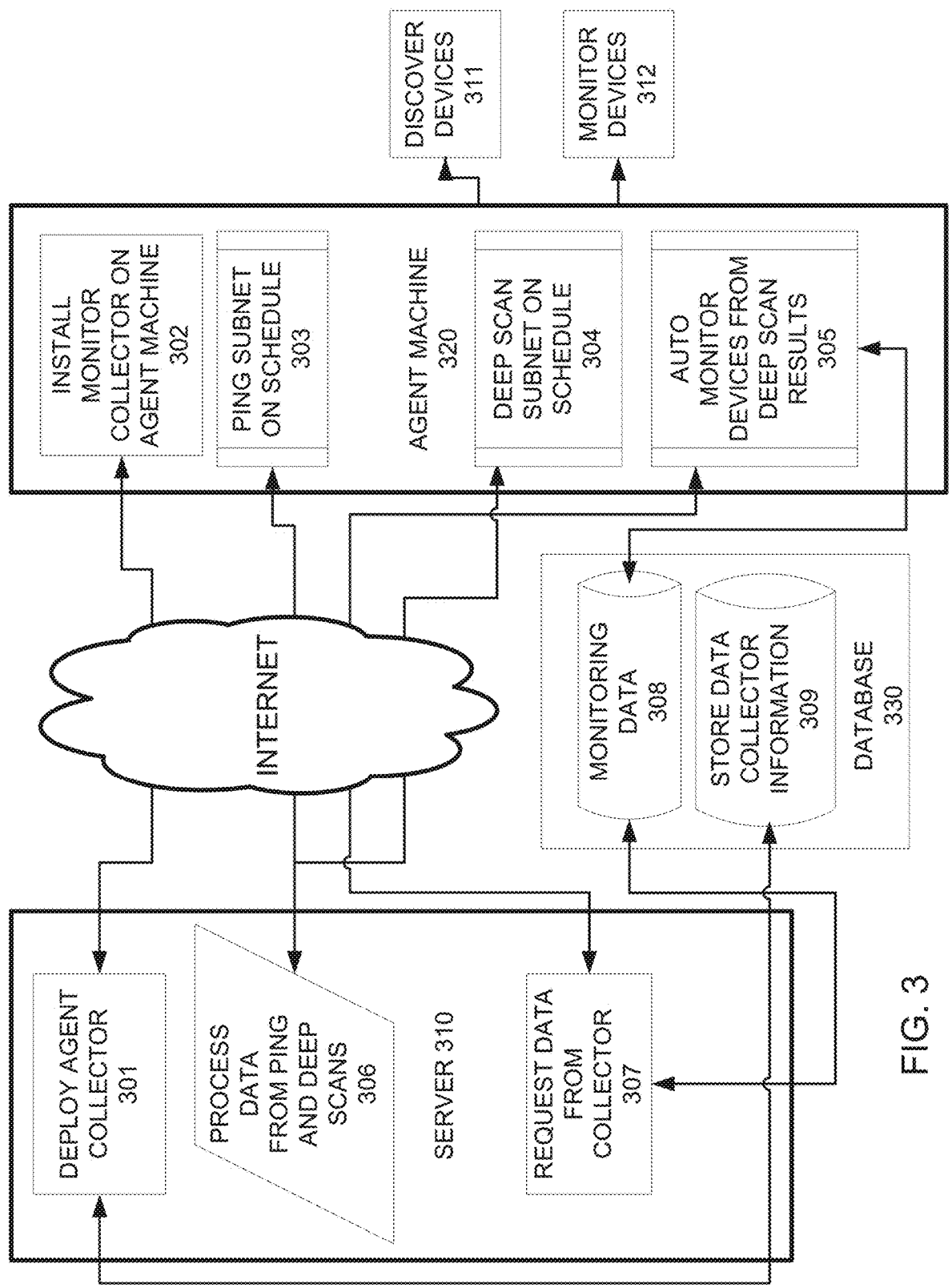
FIG. 3 illustrates an example data logic flow diagram, according to example embodiments of the present invention.

FIG. 3 illustrates an example flow diagram and logic diagram of operations performed according to example embodiments of the present invention. Referring to FIG. 3, a collector deployment operation is initiated at operation 301. The server 310 may transfer a discovery collector during operation 301 to the agent machine 320, in order to begin discovery devices operating on the network. The agent machine 320 may be one or more network devices operating on a customer site network illustrated in FIG. 4. The agent machine 320 may be a stand-alone server or user computer that is designated as the agent machine 320.

The server 310 of the monitoring administrative side of the network may be the same as the server 104 of FIG. 1.

The agent collector scan application is transferred to the agent machine or device 320, which installs the discovery collector and/or monitor collector applications on the agent machine 320, at operation 302. The agent machine 320 may perform any of a variety of different device discovery operations. At operation 303, the agent machine 320 will ping the network devices and share the results with the server 310. The ping result data will be processed at operation 306 and the monitor collector may be created to determine the objects and/or attributes of the network devices that need to be monitored.

The ping results and monitor collector may produce results used to perform a "deep scan." The initial scan discovers network devices and may perform similar discovery operations. The deep scan may determine specific information about the devices, such as, the type of device, the hardware included in the device, the software included in the device, operating systems, port information, etc. The processed data from operation 306 may be shared with the agent machine 303 to setup a deep scan operation to be performed to discover the attributes of the network devices.

The schedule may also be setup to re-scan the network devices at operation 304. The scheduled scans may be performed by the agent machine 320 without reminders or without user intervention. Any new changes since the last scan (e.g., new network devices, problems with existing devices, etc.) may be discovered and logged in the server 310. The monitoring data 308 and data collector information from the discovery and/or monitor collectors may be stored in a database 330, which may be a separate memory storage device or may be part of the agent machine 320 or server 310. The server 310 may continue to request data from the collector applications, and the agent machine 320 may auto-monitor devices from the deep scan results at operation 305. One or more of the operations performed in FIG. 3 may be a continuing process that cycles periodically based on a predefined time interval.

Figure 4:
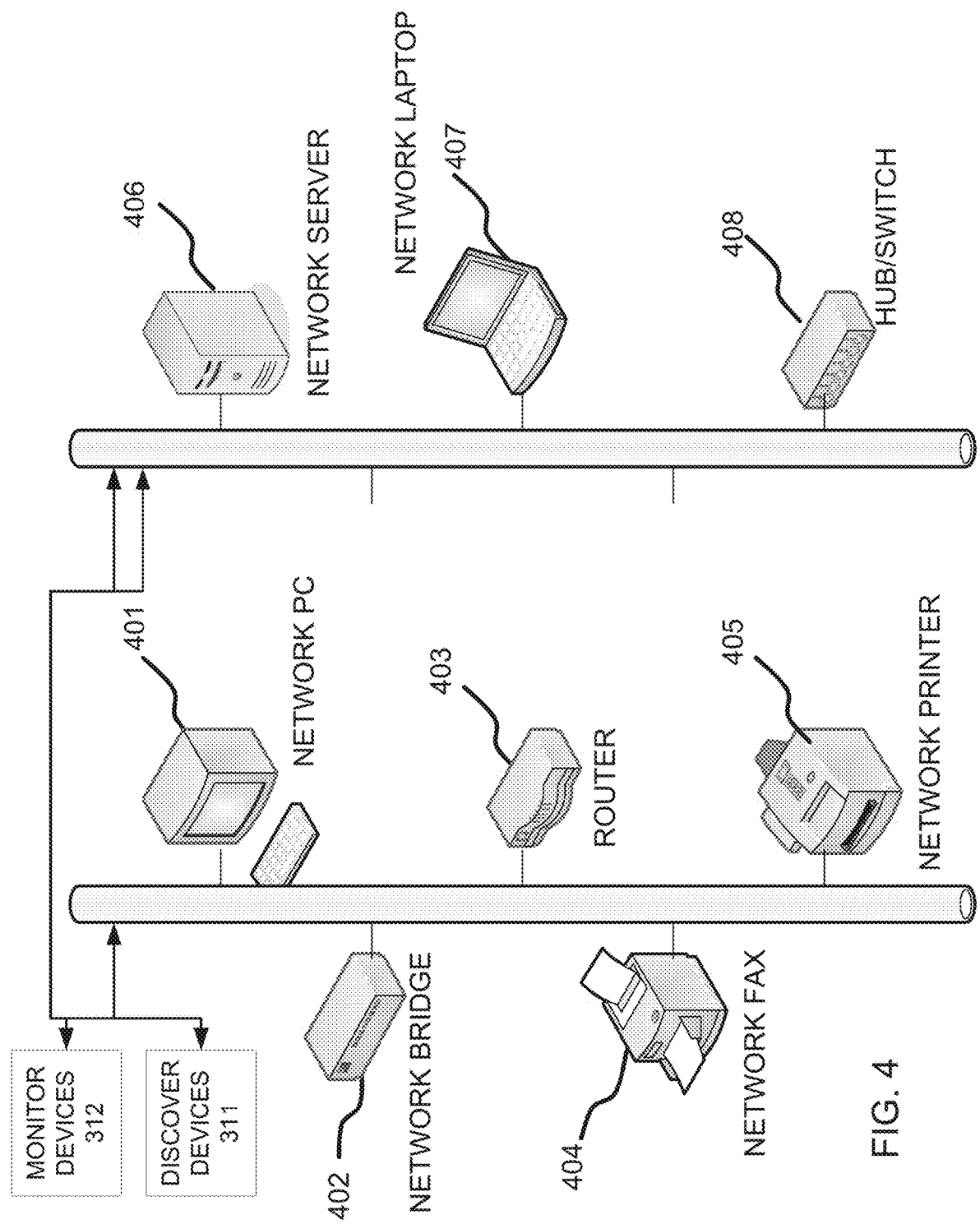
FIG. 4 illustrates a continuation of the data logic flow of FIG. 3, which includes network devices that are discovered by the agent device.

During the device discovering operation, and the monitoring operations of the discovery collector and monitor collector, certain devices operating on a customer network site may be discovered and monitored at operation 311. FIG. 4 illustrates an example customer network site that includes a variety of networking devices discoverable and which may be monitored according to example embodiments of the present invention.

Referring to FIG. 4, the discover devices operation 311 and the monitor devices operation 312 are carried over from FIG. 3. The operation discovery initiated by the discovery collector application may be performed at operation 311 to discover any of the various network devices, such as, for example, network PC 401, network bridge 402, network router 403, network fax 404, network printer 405, network server 406, network laptop 407 and network hub/switch 408. Other networking devices may be operating and may be discovered on the network as well.

Once the devices are discovered from the ping procedure or other form of device discovery operation, the devices may be monitored by determining the attributes or objects present in each device and storing the device attributes in a database. A request may be sent from the server 310 to the agent machine or computer 320 to have the monitoring collector application installed on the agent machine 320. The collector application may be a type of service that is installed on each agent monitoring computer on the subnet, or, the computer that manages the monitoring process for a particular group of network devices.

Discovered network devices 401-408 will be further analyzed to determine their hardware attributes and their respective device types. Periodic scanning (e.g., every day, hour, minute, etc.) will continue to be performed to find new devices and changes in existing devices. The periodic scanning may be performed based on a centrally managed procedure performed by the server 310 and/or the agent machine 320. As the scanning is performed, the results (e.g., network devices discovered, attributes, objects, etc.) are sent back to a database for storage.

During the initial scanning procedure (i.e., device discovery), the results may be placed in a processing queue where the deep scan procedure may be performed based on the initial scan procedure to determine device type, hardware information, ports open to the network, operating system, network card attributes, etc. The deep scan procedure may provide the necessary device objects which can be discovered, labeled, stored in a data file and used as a basis to perform periodic monitoring of the network devices and their respective objects and attributes.

Based on the results of the deep scan, the monitoring may be performed in a manner consistent with the type of device. For example, a Windows®, Linux®, Unix®, and/or Macintosh® computer device will be monitored for CPU utilization, memory availability, network characteristics and/or disk space availability. Any of these device objects may be associated with a threshold level indicating too much or too little resources available for a particular device. Thresholds that are met may trigger alarms that notify administrators of the network device problems. Notifications of thresholds being exceeded may be sent via network messaging, emails, text messages, etc.

Additional monitoring features may include monitoring network traffic for routers 403 and switches 408. The monitor collector may operate by sending a request to each device being monitored. For example, the router 403 may receive a request for traffic information (i.e., packets sent, received, etc.). The designated agent machine "collector" may then store this information locally or in a database. All of these above-noted operations may be performed automatically without user intervention. As changes are made, the monitoring procedures will reflect these changes. For example, a new network card is added to a server 406, the monitor collector service will discover the change and begin monitoring the new network card.

Figure 6:
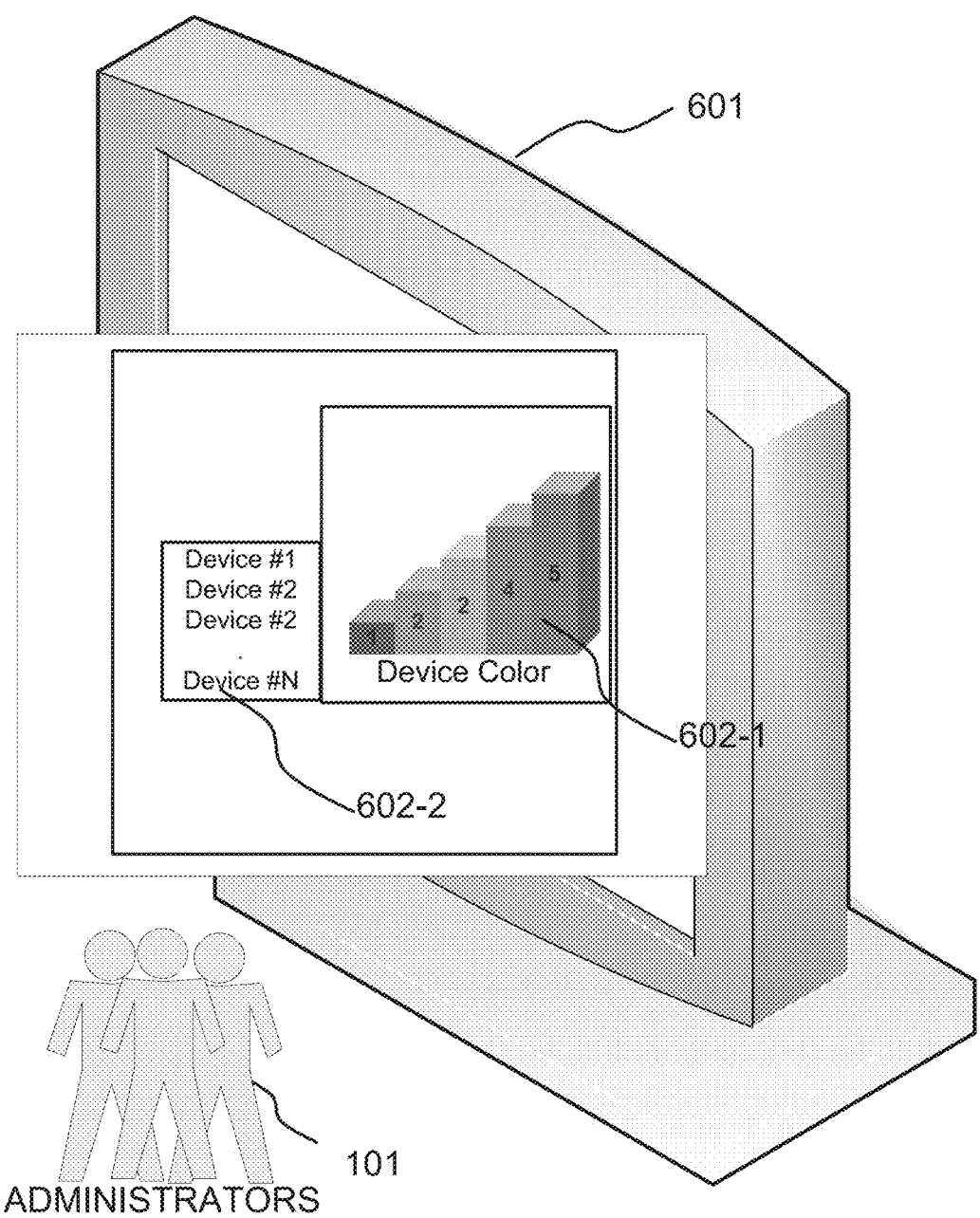
FIG. 6 illustrates an example an example graphical user interface (GUI) of the collected monitoring information resulting from the scanning processes.

FIG. 6 illustrates an example of a display 601 viewable by the administrators 101, according to example embodiments of the present invention. Referring to FIG. 6, the monitoring data stored by the collector may be compiled and formatted into monitoring interfaces viewable by administrators 101. The devices may be tracked by performance charts 602-1 and listed according to their device number 602-2 to provide simple monitoring formats for administrators 101. An application programming interface (API) may be used to link the monitor collector to return monitoring data to the GUI illustrated in FIG. 6. The monitoring data may be stored in the collector in text format, and in round robin database files on the server 310 or remote database 330.

The network device may have a process that is used to gather all of its audit data, such as, a brute force test that audits all software processes, applications and hardware components and reports the results. The resulting audit data is then forwarded back to the server to be stored in a database 330 for future use. The auditing may be scheduled to ensure regular changes are kept up-to-date automatically. The regular intervals keeps the server and user devices synchronized.

Figure 7:
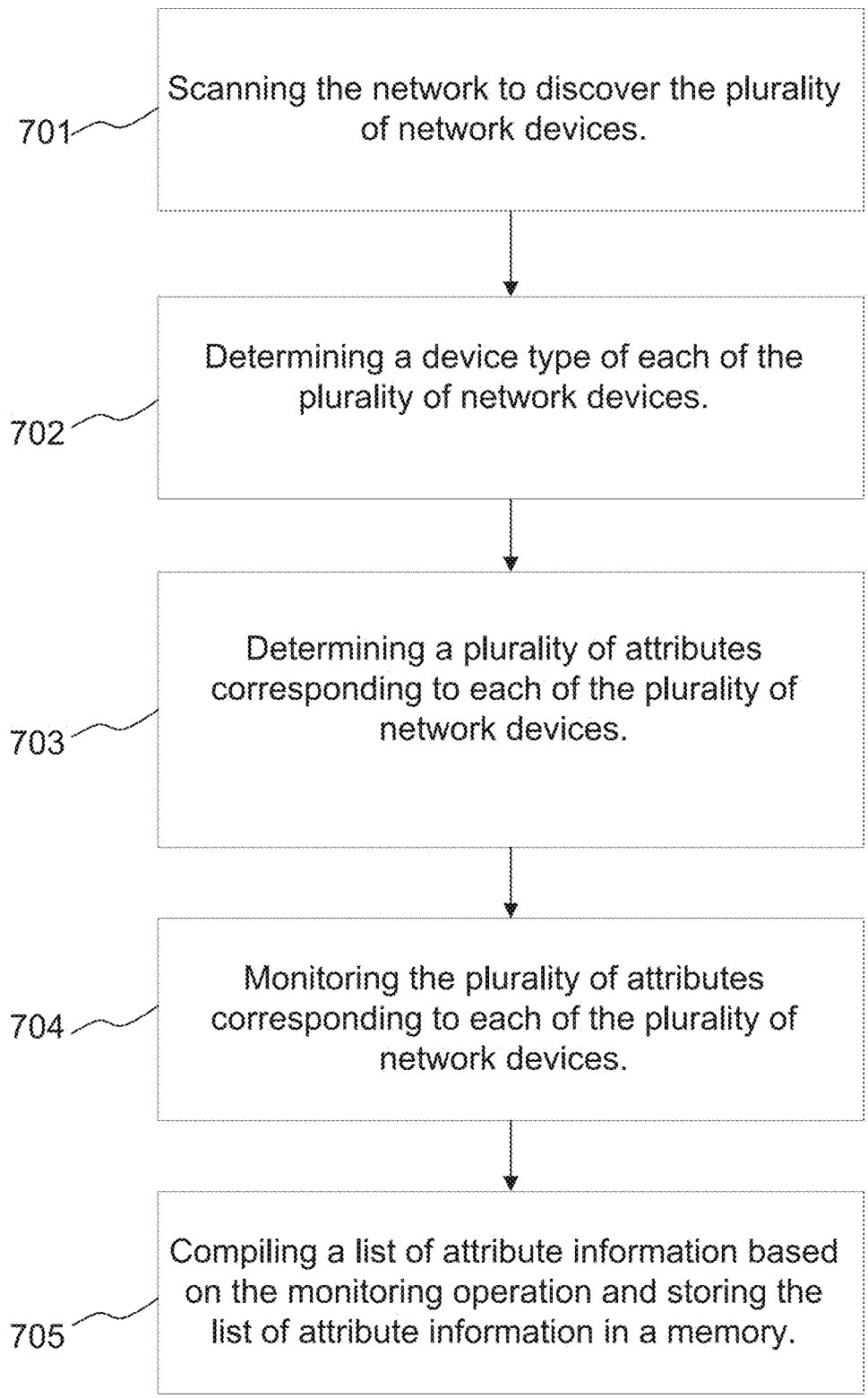
FIG. 7 illustrates a flow diagram of an example method, according to example embodiments of the present invention.

One example method discovering and monitoring a plurality of network devices operating on a network is illustrated in FIG. 7, according to example embodiments of the present invention. Referring to FIG. 7, scanning the network to discover the plurality of network devices is performed at operation 701. Next, determining a device type of each of the plurality of network devices is performed at operation 702. The method may also include determining a plurality of attributes corresponding to each of the plurality of network devices at operation 703, and monitoring the plurality of attributes corresponding to each of the plurality of network devices at operation 704. The method may further include compiling a list of attribute information based on the monitoring operation and storing the list of attribute information in a memory at operation 705.

The audited network device information may be automatically transferred from the computer device to a server more than once based on a predefined update schedule. The example method noted above may also include determining objects present in the audit information and comparing the objects present in the audit information to objects present in the predefined monitor set and creating the new monitor set by removing the objects present in the predefined monitor set which are not preset in the audit information and renaming the predefined monitor set to represent the new monitor set. This provides a process of creating a new monitor set without objects that do not require monitoring. Objects and attributes may be used interchangeably and may be considered synonymous throughout the disclosure.

Examples of attributes include information regarding hardware configurations and software configurations present in the computer device. For example, the attributes may include disk information, processor information, memory information, application information and service information. The updated or new monitor set may be stored in the memory in an XML file format. The computer devices audited to derive the monitor set may then be monitored based on the objects included in the new monitor set. Periodically, the new monitor set may continue to be updated to reflect changes that occur to the objects based on the update schedule.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 5 illustrates an example network element 500, which may represent any of the above-described network components 102, 103, 104, 105, 201, 202, 203, 310, 320 and/or 330.

Figure 5:
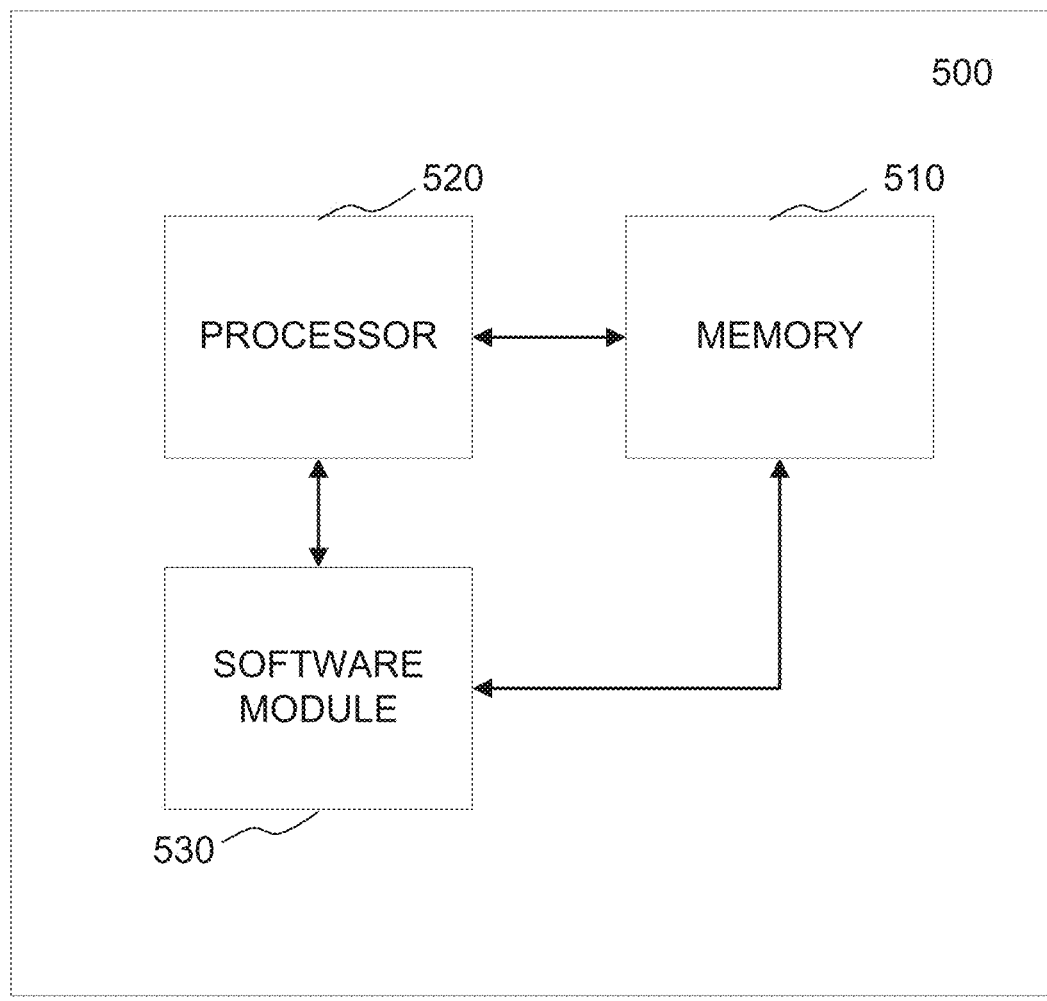
FIG. 5 illustrates an example network entity configured to store and execute any of the example applications described in the specification, according to example embodiments of the present invention.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   performing an initial scan of a network to discover a plurality of network devices using a discovery collector application on an agent device;
   performing an additional scan operation of each of the discovered plurality of network devices to determine a plurality of attributes of each of the plurality of network devices;
   identifying at least one of a processor type, memory capacity, hard disk size, number of disks, processes executing, applications installed, operating system installed, network traffic statistics, printer toner, printer paper, and peripheral devices associated with an operating status of each of the plurality of network devices;
   monitoring, via a monitor set, the plurality of attributes corresponding to each of the plurality of network devices, via the agent device, to determine whether any of the plurality of attributes have exceeded one or more predetermined threshold values set as baseline values for each of the plurality of attributes;
   determining an amount of usage over a predefined period of time of the plurality of attributes based on current operating conditions of the plurality of network devices by collecting usage information of the plurality of attributes; and
   creating at least one new threshold value based on the monitoring operation and the determined amount of usage, based on the collected usage information, of the plurality of network devices over the predefined period of time, the at least one new threshold value being set as a new baseline value designated for subsequent monitoring of the plurality of attributes of the plurality of network devices.

2. The method of claim 1, further comprising compiling a list of attribute information based on the monitoring operation and storing the list of attribute information in a memory.

3. The method of claim 2, further comprising re-scanning the network at predefined time intervals to determine whether any changes have occurred since the last scanning operation and storing the changes in the list of attribute information.

4. The method of claim 3, wherein the changes comprise at least one of a network device that is no longer available, a new network device that has been added to the network since the last scanning operation, hardware modifications made to any of the network devices, and a predetermined performance threshold that has been exceeded for at least one of the plurality of attributes.

5. The method of claim 1 comprising compiling results of the initial scan operation.

6. The method of claim 1, wherein the plurality of attributes comprise a device type, available hardware, open ports, an operating system and network card information available for each of the plurality of network devices.

7. The method of claim 1, wherein the scanning operation and the monitoring operation are performed autonomously without user intervention.

8. An apparatus, comprising:
 a memory configured to store information regarding a plurality of network devices and a discovery collector application received from a server; and
 a processor configured to
 perform an initial scan of a network to discover the plurality of network devices using the discovery collector application,
 perform an additional scan operation of each of the discovered plurality of network devices to determine a plurality of attributes of each of the plurality of network devices,
 identify at least one of a processor type, memory capacity, hard disk size, number of disks, processes executing, applications installed, operating system installed, network traffic statistics, printer toner, printer paper, and peripheral devices associated with an operating status of each of the plurality of network devices,
 monitor, via a monitor set, the plurality of attributes corresponding to each of the plurality of network devices to determine whether any of the plurality of attributes have exceeded one or more predetermined threshold values set as baseline values for each of the plurality of attributes,
 determine an amount of usage over a predefined period of time of the plurality of attributes based on current operating conditions of the plurality of network devices by a collection of usage information of the plurality of attributes,
 create at least one new threshold value based on the monitoring information and the determined amount of usage, based on the collected usage information, of the plurality of network devices over the predefined period of time, the at least one new threshold value being set as a new baseline value designated for subsequent monitoring of the plurality of attributes of the plurality of network devices.

9. The apparatus of claim 8, wherein the processor is further configured to compile a list of attribute information based on the monitoring operation and store the list of attribute information in the memory.

10. The apparatus of claim 9, wherein the processor is further configured to perform a re-scan operation on the network at predefined time intervals to determine whether any changes have occurred since the last scanning operation and to store the changes in the list of attribute information.

11. The apparatus of claim 10, wherein the changes comprise at least one of a network device that is no longer available, a new network device that has been added to the network since the last scanning operation, hardware modifications made to any of the network devices, and a predetermined performance threshold that has been exceeded for at least one of the plurality of attributes.

12. The apparatus of claim 8, wherein the processor is further configured to compile results of the initial scan operation.

13. The apparatus of claim 8, wherein the plurality of attributes comprise a device type, available hardware, open ports, an operating system and network card information available for each of the plurality of network devices.

14. The apparatus of claim 8, wherein the scan and the monitor operation are performed autonomously without user intervention.

15. A non-transitory computer readable storage medium comprising instructions that when executed cause a processor to perform:
 performing an initial scan of a network to discover a plurality of network devices using a discovery collector application on an agent device;
 performing an additional scan operation of each of the discovered plurality of network devices to determine a plurality of attributes of each of the plurality of network devices;
 identifying at least one of a processor type, memory capacity, hard disk size, number of disks, processes executing, applications installed, operating system installed, network traffic statistics, printer toner, printer paper, and peripheral devices associated with an operating status of each of the plurality of network devices;
 monitoring, via a monitor set the plurality of attributes corresponding to each of the plurality of network devices, via the agent device, to determine whether any of the plurality of attributes have exceeded one or more predetermined threshold values set as baseline values for each of the plurality of attributes;
 determining an amount of usage over a predefined period of time of the plurality of attributes based on current operating conditions of the plurality of network devices by collecting usage information of the plurality of attributes; and
 creating at least one new threshold value based on the monitoring operation and the determined amount of usage, based on the collected usage information, of the plurality of network devices over the predefined period of time, the at least one new threshold value being set as a new baseline value designated for subsequent monitoring of the plurality of attributes of the plurality of network devices.

16. The non-transitory computer readable storage medium of claim 15, further comprising compiling a list of attribute information based on the monitoring operation and storing the list of attribute information in a memory.

17. The non-transitory computer readable storage medium of claim 16, further comprising re-scanning the network at predefined time intervals to determine whether any changes have occurred since the last scanning operation and storing the changes in the list of attribute information.

18. The non-transitory computer readable storage medium of claim 17, wherein the changes comprise at least one of a network device that is no longer available, a new network device that has been added to the network since the last scanning operation, hardware modifications made to any of the network devices, and a predetermined performance threshold that has been exceeded for at least one of the plurality of attributes.

19. The non-transitory computer readable storage medium of claim 15, further comprising compiling results of the initial scan operation.

20. The non-transitory computer readable storage medium of claim 15, wherein the plurality of attributes comprise a device type, available hardware, open ports, an operating system and network card information available for each of the plurality of network devices.

\* \* \* \* \*